J. DOVE-SMITH.
PNEUMATIC WHEEL.
APPLICATION FILED DEC. 3, 1913.
1,135,779.
Patented Apr. 13, 1915.
2 SHEETS—SHEET 1.
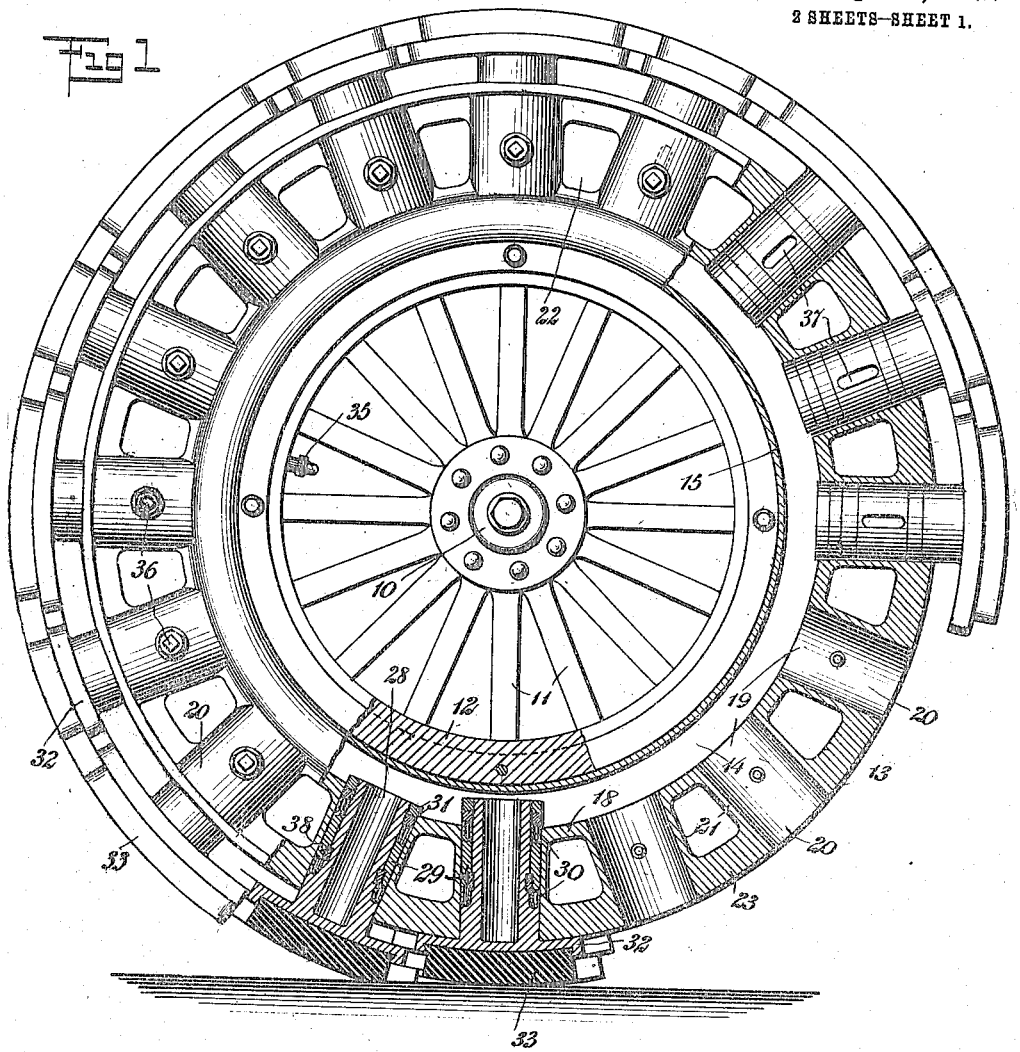
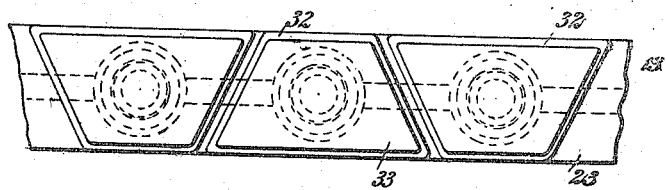
WITNESSES
INVENTOR
Joseph Dove-Smith
BY
ATTORNEYS J. DOVE-SMITH.
PNEUMATIC WHEEL.
APPLICATION FILED DEC. 3, 1913.
1,135,779.
Patented Apr. 13, 1915.
2 SHEETS—SHEET 2.
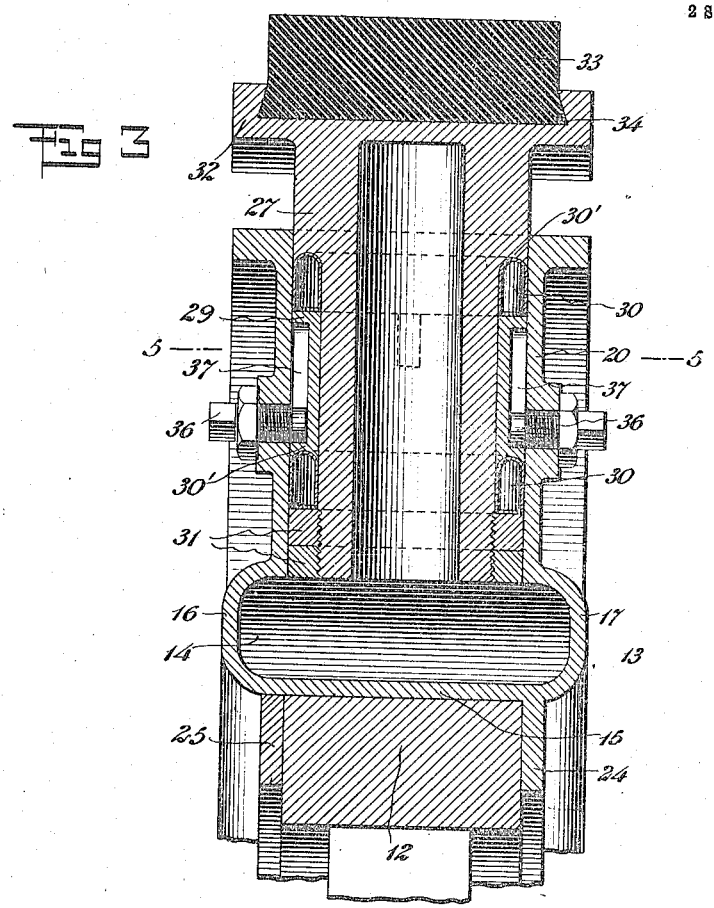
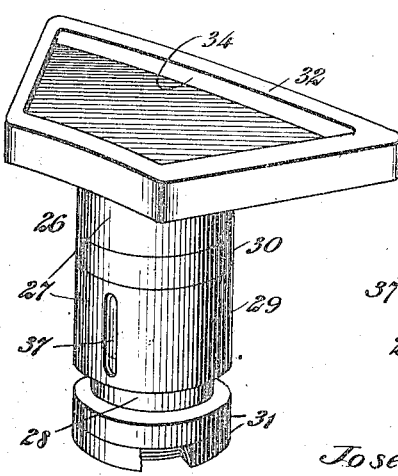
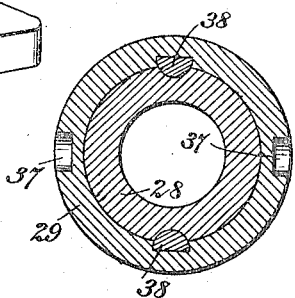
WITNESSES
C. J. Hachenberg.
Geo. L. Beeler.
INVENTOR
Joseph Dove-Smith
BY Munn & Co
ATTORNEYS

UNITED STATES PATENT OFFICE.

JOSEPH DOVE-SMITH, OF NIAGARA FALLS, NEW YORK.

PNEUMATIC WHEEL.

1,135,779. Specification of Letters Patent. Patented Apr. 13, 1915.

Application filed December 3, 1913. Serial No. 804,390.

*To all whom it may concern:*

Be it known that I, JOSEPH DOVE-SMITH, citizen of the British Empire, and a resident of Niagara Falls, in the county of Niagara and State of New York, have invented a new and Improved Pneumatic Wheel, of which the following is a full, clear, and exact description.

This invention relates to resilient wheels and has particular reference to wheels of this character which are intended to afford a cushioned support for vehicles or the like but without the attendant dangers or annoyances incident to wheels having tires made of rubber or rubber composition.

Among the objects of the invention, more definitely stated, is to provide a wheel of any ordinary or conventional form with respect especially to the hubs, spokes and rim, but provided on the periphery of said rim with a peculiar form of auxiliary rim in the nature of a rigid shell having a circumferential air chamber and provided with a circular series of radially movable plungers communicating at their inner ends with said air chamber and constituting at their outer ends the tread portions of the wheel.

Another object of the invention is to simplify and practicalize the construction of tread plungers whereby they are made to operate perfectly and reliably.

The foregoing and other objects of the invention will hereinafter be more fully described and claimed and illustrated in the drawings forming a part of this specification in which like characters of reference indicate corresponding parts in all the views, and in which—

Figure 1 is a side elevation of a wheel made in accordance with a preferred embodiment of this invention, parts being in section and other parts broken away to show the interior construction; Fig. 2 is a plan view or development of a portion of the wheel tread; Fig. 3 is a vertical transverse section of one of the tread members, showing its relation in normal position to the rigid parts of the wheel; Fig. 4 is a detail in perspective of one of the plungers; and Fig. 5 is a detail on the line 5—5 of Fig. 3.

The several parts of the device may be made of any suitable materials, and the relative sizes and proportions, as well as the general design of the mechanism, may be varied to a considerable extent without departing from the spirit of the invention hereinafter more fully set forth and specifically claimed.

By way of illustration of a practical embodiment of the invention, I show at 10 a hub of any ordinary or suitable size or type of wheel having spokes 11 and a solid rim 12 to which my specific improvement is adapted to be secured. Said rim 12 as ordinarily made is cylindrical in form and provided with a smooth periphery upon which an auxiliary rim or casing 13 may be slipped and secured by any suitable or reliable means. Said auxiliary rim or casing 13 as shown is preferably constructed so as to include an annular air chamber 14 adapted to extend around and in close relation to the wheel rim 12 and of substantially the same width as the wheel and of considerable radial depth, the shell 13 including solid walls 15, 16 and 17. The wall 15 is fitted to the periphery of the rim 12, and opposite it on the other side of the chamber 14 is a wall 18 having formed therethrough a series of holes 19.

The numeral 20 indicates a series of cylinders communicating with and extending outwardly radially from said holes 19. The cylinder walls 21 are spaced from each other, as shown at 22, intermediate their ends, and at 23 the outer ends of the adjacent cylinders are connected by a web which but for the cylinder openings is continuous all the way around the casing 13. It will thus be seen that the chamber walls 15, 16, 17 and 18, the cylinder walls 21 and the web 23 constitute an integral structure which may be made as a single casting or in any other suitable manner. This casing may be secured to the wheel rim 12 in any manner well understood in the art as, for instance, by means of an inwardly extending integral flange 24 on one side of the rim 12 and a detachable rim or flange 25 on the opposite side of the rim 12.

In each of the cylinders 20 is slidably fitted a plunger 26 comprising a piston-like stem 27 which is fitted in the corresponding cylinder 20 as a piston of an engine is fitted in its cylinder, and is adapted for limited movement radially of the wheel as hereinafter more fully set forth. Each piston 27 comprises, in connection with the rigid stem portion 28, a sleeve 29 arranged between a pair of airtight packing members 30. Each of these packing members is substantially U-shaped in cross section and has its open portion on the inside or toward the hub of the wheel. These members may be made of leather, sheet metal or any other suitable material adapting them to spread under the force of the compressed air within the chamber 14 and thereby automatically seal the space between the stem 28 and the wall of the cylinder 20. The sleeve 29 and the packing members 30 are secured in place upon the stem 28 by means of lock nuts 31. From Fig. 3 it will be observed that the shoulder 30' against which the closed outer end of each of the packing members is seated is preferably concave which gives a firm and secure bearing seat for such member and which adds to the air locking effect of such member. Any air from the chamber 14 which may leak through between the lock nuts 31 and the wall of the cylinder 20 will fill the first or inner member 30 and spread the same, making it difficult for any of the air to pass beyond it, but by provision of the outer member 30 the air sealing is made complete.

The outer end of each of the members 27 consists of a head 32 which is substantially arc-shaped in a direction around the wheel and is adapted to bear against the web 23 of the casing whereby the inward radial movement of the plunger is limited as shown at the bottom of Fig. 1, preventing the inner end of the plunger from impinging against the inner wall of the annular air chamber 14. Normally the inner end of each plunger lies substantially flush with the outer wall of said chamber. Each of these heads may be fitted with a cushion 33, if desired, to deaden the noise and assist in relieving any shocks. The cushion 33 may be dove-tailed into a seat 34 on the head 32 or secured in any other suitable manner. As viewed in Fig. 2, the heads 32 are trapezoidal in form or have their ends beveled in opposite directions, whereby the ends of adjacent heads overlap each other circumferentially of the wheel. In other words, each of the heads has a longer and a shorter lateral edge, and the shorter edge of one head alines with the longer edge of the next adjacent head around the wheel. It is obvious, however, that the adjacent ends of any two adjacent heads may be so arranged as to overlap without adhering strictly to the form herein shown and whereby similar effect may be produced.

Air under pressure is forced into the chamber 14 through a valve 35 arranged at any suitable place and in a manner quite similar to the manner of inflating an ordinary resilient pneumatic tire. The compressed air within the chamber 14 communicates with all of the plungers 27 and acting upon their inner ends tends to maintain the plungers forced outwardly, as shown in Fig. 3 and in Fig. 1 as to all of the plungers excepting those upon which the wheel is resting. By constructing the plungers of sufficient length and maintaining a high pressure of air within the chamber, the normal weight upon the wheel will be supported by the air cushion rather than upon the head 32 bearing upon the rim or web 23, as shown in Fig. 1, this figure showing the position of the lowermost plunger when under extreme compression. It will be observed also that the radial throw of the plungers is less than the radial diameter of the air chamber 14 whereby the compressed air always will be effective to restore any plunger to normal position after being compressed to the maximum extent.

The plungers are maintained in proper position in their respective cylinders 20 by a pair of studs 36 extending into grooves 37 in any suitable part of the plunger, shown, however, as in the sleeve 29. These studs 36 prevent rotation of the plungers, and hence maintain their tread members or heads 32 in proper alinement. They also prevent the outward radial movement of the plungers under the force of the compressed air within the chamber tending to force them outward.

The casing 13 and the set of plungers carried thereby constitute a complete device adapted to be readily fitted to practically any ordinary form of wheel having a solid rim 12. These devices being made in various sizes may be readily fitted to practically any common wheel now in use. It is to be noted also that a wheel equipped with this improvement is substantially equivalent in resiliency to the pneumatic wheel now in common use but is not subject to blow-outs, punctures or other dangerous accompaniments of the common pneumatic wheel.

Any suitable means may be used to prevent the tread members 27 from rotating within the sleeves 29. To this end I use, by way of illustration, one or more keys 38 acting between the stem 28 and the sleeve 29.

Having thus described my invention, I claim as new and desire to secure by Letters Patent:—

In a pneumatic wheel, the combination with a wheel structure including a solid rim, of a casing fitted to said rim and including an annular air chamber and a circular series of plungers slidably fitted in the respective cylinders and maintained normally pressed outwardly by the air within the cylinder, each of the plungers including a stem extending through its cylinder, a sleeve fitted to the stem, a plurality of expansible packing members adjacent the ends of said sleeve and serving to make the plunger airtight, means acting between the casing and the sleeve to prevent rotation of the sleeve while permitting reciprocation of the same with the other parts of the plunger, and means to prevent rotation of the stem within the sleeve.

In testimony whereof I have signed my name to this specification in the presence of two subscribing witnesses.

JOSEPH DOVE-SMITH.

Witnesses:
E. R. DEWART,
HUGH HEATHLEY WILSON.